(12) United States Patent
Yamin, Sr.

(10) Patent No.: US 11,794,703 B2
(45) Date of Patent: Oct. 24, 2023

(54) CARWASH DRYER APPARATUS AND METHOD

(71) Applicant: Gallop Brush LLC, Imlay City, MI (US)

(72) Inventor: Theodore Yamin, Sr., Imlay City, MI (US)

(73) Assignee: Gallop Brush LLC, Imlay City, MI (US)

( * ) Notice: Subject to any disclaimer, the term of this patent is extended or adjusted under 35 U.S.C. 154(b) by 0 days.

(21) Appl. No.: 18/113,355

(22) Filed: Feb. 23, 2023

(65) Prior Publication Data

US 2023/0264661 A1    Aug. 24, 2023

Related U.S. Application Data

(60) Provisional application No. 63/312,976, filed on Feb. 23, 2022.

(51) Int. Cl.
*F26B 5/16* (2006.01)
*B60S 3/00* (2006.01)

(52) U.S. Cl.
CPC ............... *B60S 3/002* (2013.01); *F26B 5/16* (2013.01); *F26B 2210/12* (2013.01)

(58) Field of Classification Search
CPC ......... B60S 3/002; F26B 5/16; F26B 2210/12
USPC .................................................. 34/355, 666
See application file for complete search history.

(56) References Cited

U.S. PATENT DOCUMENTS

2023/0009380 A1 *   1/2023   Kuper ................ A46B 9/028

FOREIGN PATENT DOCUMENTS

| DE | 102021101051 A1 * | 7/2022 | |
| EP | 3213969 A1 * | 9/2017 | .......... A46B 13/006 |
| KR | 1376373 B1 * | 3/2014 | |
| WO | WO-2004089708 A2 * | 10/2004 | .............. B60S 3/002 |

* cited by examiner

*Primary Examiner* — John P McCormack
(74) *Attorney, Agent, or Firm* — Thomas Heed; Heed Law Group

(57) ABSTRACT

The present invention, a carwash dryer apparatus and method, is detailed. The apparatus uses a plurality of drying scoop assemblies to remove water from a wet vehicle through contact. The drying scoops are made from 10-lb foam or felt. The apparatus is then dried by spinning until it has released the absorbed water. The scoop shape facilitates both quick drying of vehicles and the rapid elimination of moisture from the scoops, themselves. The method allows for the sensing of the water retained in the plurality of drying scoop assemblies and adjusts the voltage in order to eliminate the water.

26 Claims, 9 Drawing Sheets

CARWASH DRYER APPARATUS AND METHOD

CLAIM OF PRIORITY

This non-provisional utility patent application claims priority to provisional patent application 63/312,976, filed Feb. 23, 2022, and entitled, "Carwash Dryer Apparatus and Method".

FIELD OF INVENTION

The present invention relates to the classification for Servicing, Cleaning, Repairing, Supporting, Lifting, or Maneuvering of Vehicles Not Otherwise Provided for; and to one or more sub-classifications for Vehicle cleaning apparatus not integral with vehicles, for exteriors of land vehicles, with rotary bodies contacting the vehicles. Specifically, the present invention relates to a carwash dryer apparatus.

BACKGROUND OF INVENTION

Modern carwashes deploy a plurality of rotary brushes to remove dirt and debris from the exterior of motor vehicles. In order to dry the vehicle after washing its exterior, most carwashes use some sort of air dryer. The air dryers are typically organized in an array intended to maximize the amount of air blown at the car surface.

Air dryers are noisy and use a lot of energy. The concerns about noise and energy might be discounted if the air dryers actually performed as intended. The reality is that an air dryer in a carwash almost never gets the vehicle dry. In the summer time in most climates, this is merely an irritation, resulting in spotting if left unattended. In the wintertime in northern climates, the moisture on the vehicle surface can freeze after a carwash, creating esthetic issues at the least. At the worst, water from a carwash can freeze, jamming lock cylinders, immobilizing windows, and obscuring the side mirrors. In arid climates, moisture on the exterior of the vehicle can result in the car quickly becoming dirty again, due to air-born dust being trapped by water droplets left on the vehicle.

Recognizing the problems inherent in air drying vehicles, many carwashes deploy personnel to manually remove excess water from the vehicle, after the vehicle has passed through the air dryer. This adds both time and cost to the entire carwash operation.

The industry has searched for solutions to the problem of drying vehicles after they have been washed. One solution is a drying wheel (See e.g., U.S. Pat. No. 9,328,959) that uses cloth to dry the vehicle and then uses a beater bar to dry the cloth. The problem with this solution is that the beater bar tends to excessively wear the drying clothe, resulting in frequent scheduled and unscheduled maintenance. The drying wheel has a two-speed motor: one speed to dry the vehicle; and another, higher, speed to slap the drying cloth against the beater bar. In addition to frequent routine maintenance, the drying wheel with a beater bar is a liability concern due to the near-inevitable cloth fragments coming loose during high-speed contact with the beater bar. Additionally, any grit or debris captured by the drying wheel during drying operations will become a high-speed projectile when spun at a high-speed and beaten with a beater bar.

The carwash industry is looking for an apparatus and method of drying vehicles that works without being unduly costly or requiring significant amounts of maintenance. The prior art has not solved this problem.

SUMMARY OF INVENTION

This summary is intended to disclose the present invention, a carwash dryer apparatus and method. The embodiment and description are used to illustrate the invention and its utility and are not intended to limit the invention or its use. The following presents a simplified summary of the primary embodiment of the invention to provide a basic understanding of the invention. Additional concepts that can be added or varied with the primary embodiment are also disclosed. The present invention is novel with respect to the prior art, and can be distinguished from the prior art.

Certain terminology is used in the following description for convenience only and is not limiting. The article "a" is intended to include one or more items, and where only one item is intended the term "one" or similar language is used. To assist in the description of the present invention, words such as before, after, first, second, near, far, short, long, top, bottom, side, upper, lower, front, rear, inner, outer, right and left are used to describe the relative sequence, order, proximity, size, and orientation of aspects of the present invention, a carwash dryer apparatus and method. The terminology includes the words above specifically mentioned, derivatives thereof, and words of similar import.

In general, the present invention, a carwash dryer apparatus and method, uses highly absorbent material that is specifically configured to dry a vehicle on contact and then quickly eliminate the retained water through a combination of centrifugal force and vaporization of the retained water, drying the highly absorbent material quickly.

The apparatus has a spinning shaft. In the current embodiment, 10-lb. absorbent foam is typically used to create longitudinal members that are fashioned as drying scoops. The absorbent material used is also dependent on the overall length of the drying scoop. For shorter drying scoops, other, lighter, absorbent foams can used. Absorbent felt is also a good material for a short drying scoop. If the overall carwash dryer apparatus uses drying scoops of different lengths, different materials can be used to construct the drying scoops.

Each of the plurality of drying scoops is fabricated by taking a rectangular piece of 10-lb. foam, for example. One of the short ends is rounded. The short end opposed to the rounded end is called the fixed end. Starting at the fixed end, the two long edges of the rectangle are sewn together. An additional seam of stitching is also placed along the fold—the centerline of the material before it is folded—in proximity to the fixed end. The long edges are not sewn together in proximity to the rounded end. The resulting longitudinal member is a scoop-shaped. The rounded end is intended to be the free end.

A plurality of drying scoops are sewn to a cloth ring. The cloth ring and the plurality of drying scoops is called a drying scoop assembly. The longitudinal scoop-shaped members are attached to the cloth ring so that the centrifugal force and air opens the scoop as it rotates. The drying scoops are sewn to the cloth ring near the inner diameter and the outer diameter of the cloth ring. The drying scoop assembly fits over a cylindrical rotational core.

A foam disc spacer is placed between adjoining drying scoop assemblies. Each of the foam disc spacers is an annulus with an outer diameter and inner diameter. The outer diameter is adjusted based on the length of the drying scoops. The inner diameter is the same for all foam disc spacers and is the same as the inner diameter of the cloth ring. The inner diameter allows the foam disc spacer to fit over the outer diameter of the rotational core. At the bottom of the stack-up is a circular plastic bottom plate. It retains the spacers and drying scoop assemblies on the rotational core.

The carwash dryer apparatus is comprised of a motor, a motor controller, a drive-shaft, a cylindrical rotational core, an aluminum top plate to mate the cylindrical rotational core with the drive-shaft; a bottom plate; a plurality of drying scoops; a smaller, integer plurality of cloth rings; and a smaller, integer plurality of foam disc spacers.

For example, in one embodiment, the carwash dryer apparatus is comprised of 342 dryer scoops, 19 cloth rings, and 18 foam disc spacers. There is a number, the drying assembly integer, which is the result of dividing the number of dryer scoops by the number of cloth rings. In this case, 342/19=18. The drying assembly integer is 18. In this embodiment, therefore, each drying scoop assembly is comprised of 18 drying scoops, sewn together on a single cloth ring. The 19 drying scoop assemblies are interspersed with the 18 foam disc spacers.

In another embodiment, the carwash dryer apparatus is comprised of 270 dryer scoops, 15 cloth rings, and 15 foam disc spacers. The top view of this embodiment is shown in FIG. 5 as an example The aluminum top plate fits over the cylindrical rotational core and mates with the drive shaft. The bottom plate is mated to the bottom of the cylindrical rotational core and retains the drying scoop assemblies and foam disc spacers. The cloth rings of the drying scoop assemblies and the foam disc spacers both fit over the cylindrical rotational core and are arranged axially from the bottom of the core to the top of the core.

The motor and motor controller optimize the operation of the carwash dryer apparatus. Like most industrial voltage-controlled motors, the carwash dryer apparatus motor has a rated maximum voltage, corresponding to a maximum speed. The motor speed is continuously variable from its initial start voltage to its maximum rated voltage. The initial start voltage is the voltage required to start the unit in motion, by overcoming the rotational inertia. The carwash dryer apparatus motor operates at a first voltage while drying the exterior of a vehicle. The first voltage delivers a moderate speed to the apparatus. Once a vehicle is dried, the voltage delivered to the motor is adjusted, either up or down, in order dry the carwash dryer apparatus.

The speed at which the carwash dryer apparatus rotates is a function of both voltage delivered to the motor and the overall mass of the apparatus, which is, in turn, a function of the retained water. The amount of retained water is proportional to the motional EMF (electro-motive force) that the motor experiences in attempting to spin the carwash dryer apparatus. The motional EMF is a reverse-bias voltage that resists motion, and is well understood in the motor industry. The motional EMF can be used to measure the retained water in real time. If the drying scoops are saturated, the drying voltage will be greater than the first voltage, in order to make use of the centrifugal effect to liberate water droplets. As the drying scoops dry, the drying voltage will be lowered, because the main vector of drying will be vaporization. Vaporization can be accomplished at virtually any speed, so the voltage can be reduced. The motional EMF can be used as a measurement of when the carwash dryer apparatus is finished drying itself.

It is also possible to create an optimized curve using the back EMF as a proxy for the retained water that defines the variable speed and duration that the carwash dryer apparatus should use in order to most efficiently dry itself.

BRIEF DESCRIPTION OF THE DRAWINGS

The present invention is illustrated with 9 drawings on 9 sheets.

DETAILED DESCRIPTION

This description is intended to build on the summary and disclose the present invention, a carwash dryer apparatus and method. This description is not intended to limit the scope of the claimed subject matter. Certain terminology is used in the following description for convenience only and is not limiting. The article "a" is intended to include one or more items, and where only one item is intended the term "one" or similar language is used. To assist in the description of the present invention, words such as before, after, first, second, near, far, short, long, top, bottom, side, upper, lower, front, rear, inner, outer, right and left are used to describe the relative sequence, order, proximity, size, and orientation of aspects of the present invention, a carwash dryer apparatus and method. The terminology includes the words above specifically mentioned, derivatives thereof, and words of similar import. Once a numbered element is described within this Detailed Description, it may be referred to with respect to other figures. The Detailed Description references the set of 9 Figures on 8 sheets.

Figure 1A:
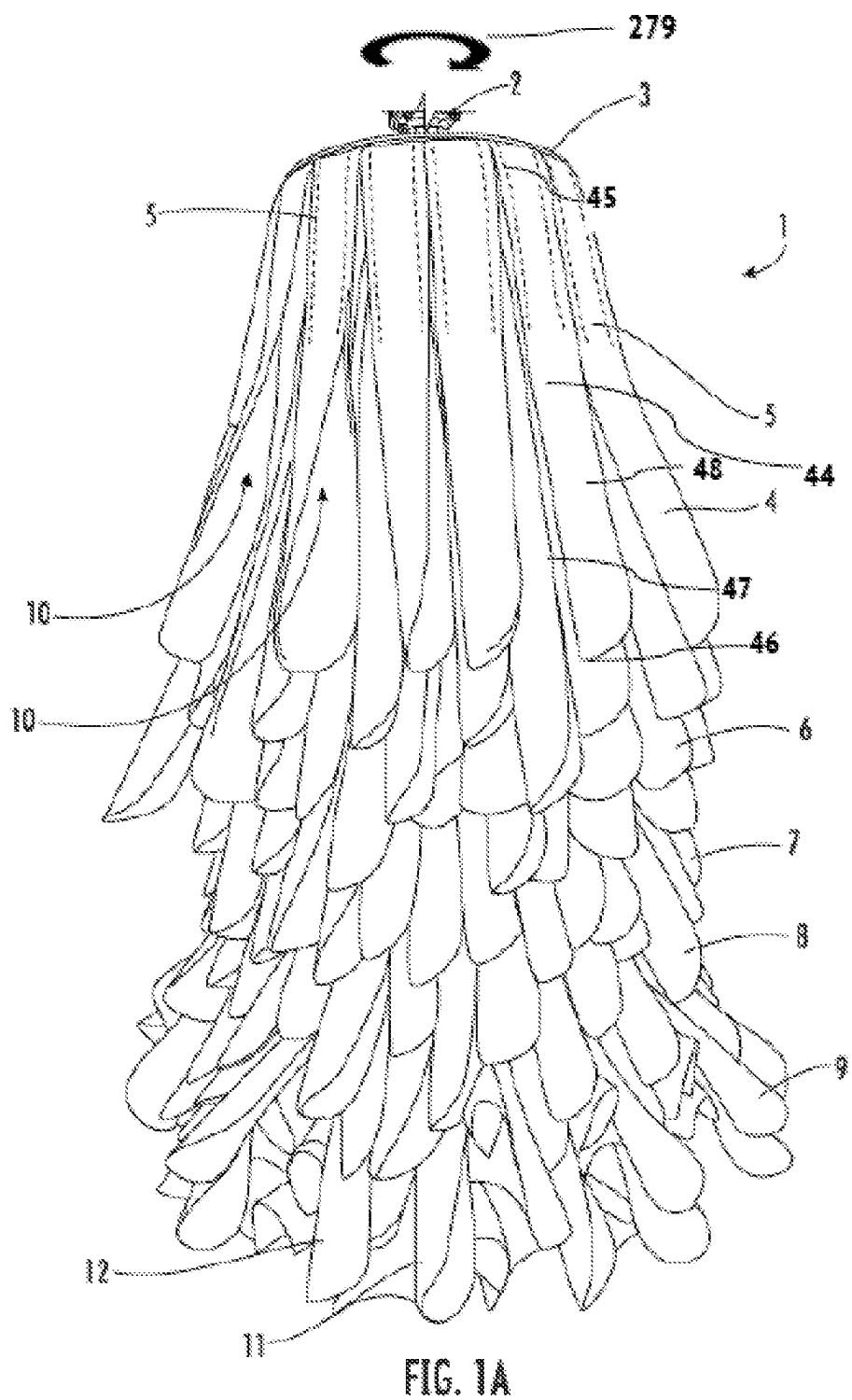
FIG. 1A is a side view of the carwash dryer apparatus at rest.

FIG. 1A shows a first embodiment of the carwash dryer apparatus 1. It is comprised of a plurality of longitudinal drying scoops 4, 6, 7, 8, 9, 11, 12, 44. The drying scoops have an opening 10 that catches air when the carwash dryer apparatus 1 rotates. An aluminum top plate 3 is visible on-edge at the top of the drawing, as is the drive shaft 2. The carwash dryer apparatus 1 has a rotational direction of motion 279.

Figure 1B:
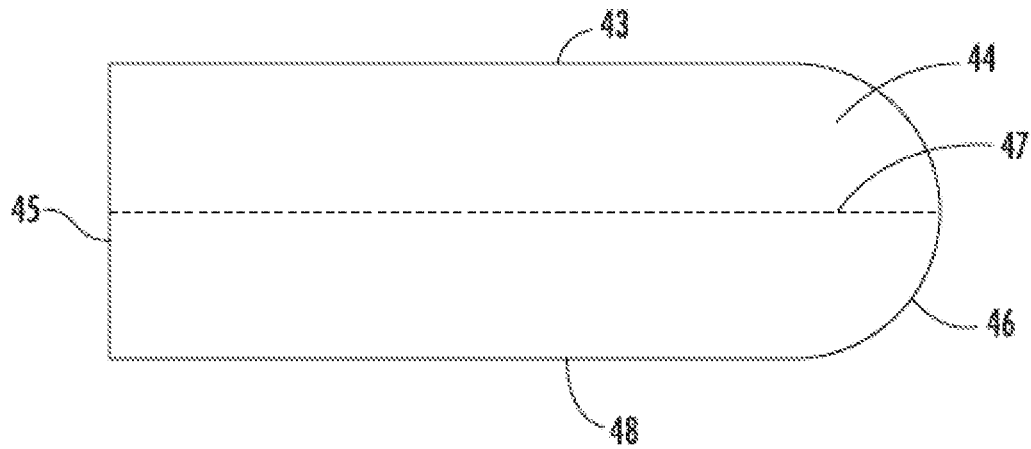
FIG. 1B is a top view of the scoop during fabrication.
Figure 1C:
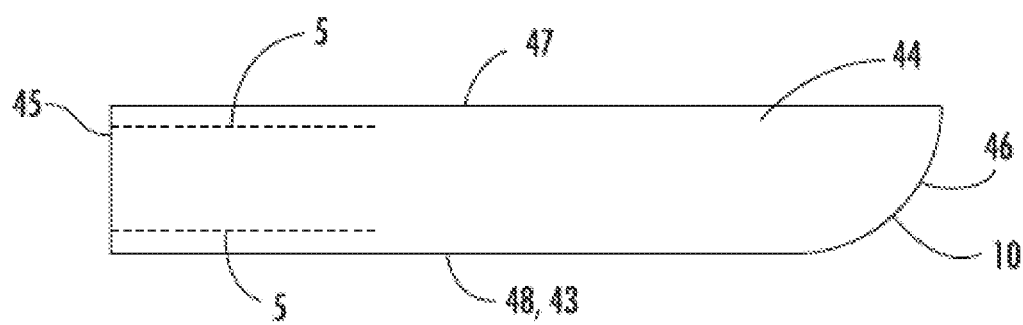
FIG. 1C is a top view of a completed scoop.

FIGS. 1B and 1C show a scoop 44 being fabricated. The scoop 44 is typically fabricated from 10-lb foam. For shorter scoops, absorbent felt is used. The scoop 44 has two long edges 43, 48 and a centerline 47. There are two short edges 45, 46. One short edge 45 is referred to as the fixed edge 45. The other short edge 46 is rounded 46 and is referred to as the free edge 46. The scoop 44 is folded along the centerline 47 and stitched 5 along the long edge 48, 43 and the centerline 47 in proximity to the fixed edge 45. One long edge 48, 43 is designated the open long edge and one long edge is designated the closed long edge 47. So constructed, the scoop 44 has an opening 10 accessible along the open long edge 48, 43 near the free edge 46. The closed long edge 47 does not have an opening 10 from the fixed edge 45 to the free edge 46.

Figure 2:
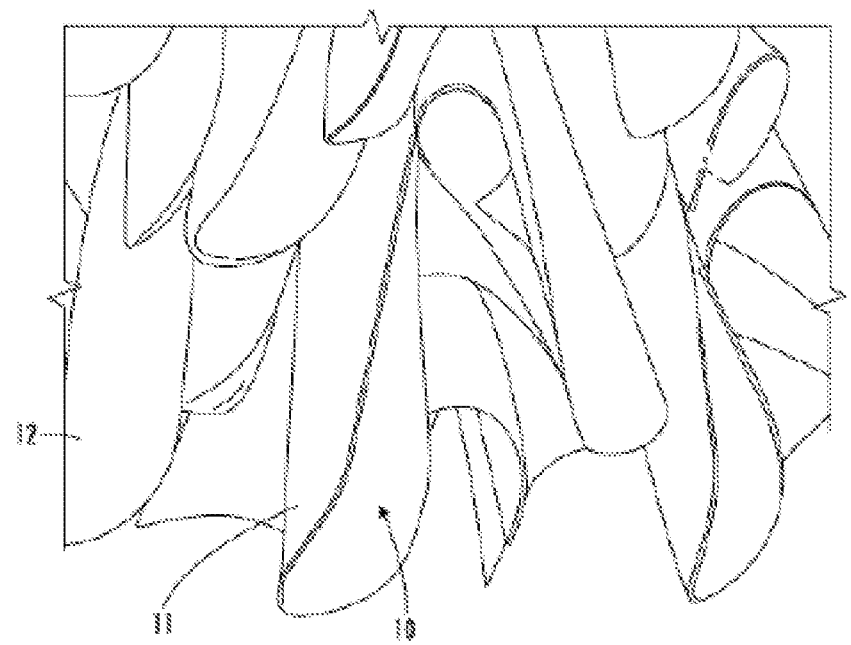
FIG. 2 is a close-up side view of the carwash dryer apparatus at rest, showing the individual drying scoops.

FIG. 2 shows two 11, 12 of the plurality of longitudinal drying scoops. The opening 10 of one of the scoops 11 is visible in more detail.

Figure 3:
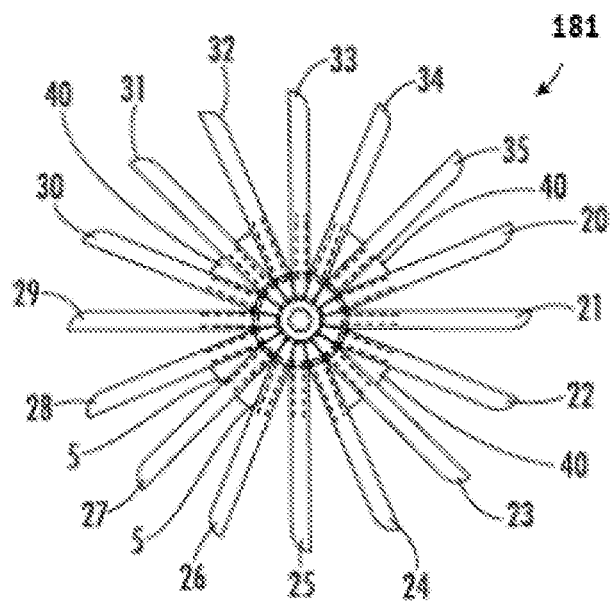
FIG. 3 is a top view of a drying scoop assembly.

FIG. 3 shows a top view of a drying scoop assembly 181. In this example, the drying scoop assembly 181 has a plurality of sixteen longitudinal drying scoops 20, 21, 22, 23, 24, 25, 26, 27, 28, 29, 30, 31, 32, 33, 34, 35. The drying scoop assembly 181 has a foam disc spacer 40 underneath with an outer diameter 41. The foam disc spacer 40 separates this drying scoop assembly 181 from other drying scoop assemblies.

Figure 4:
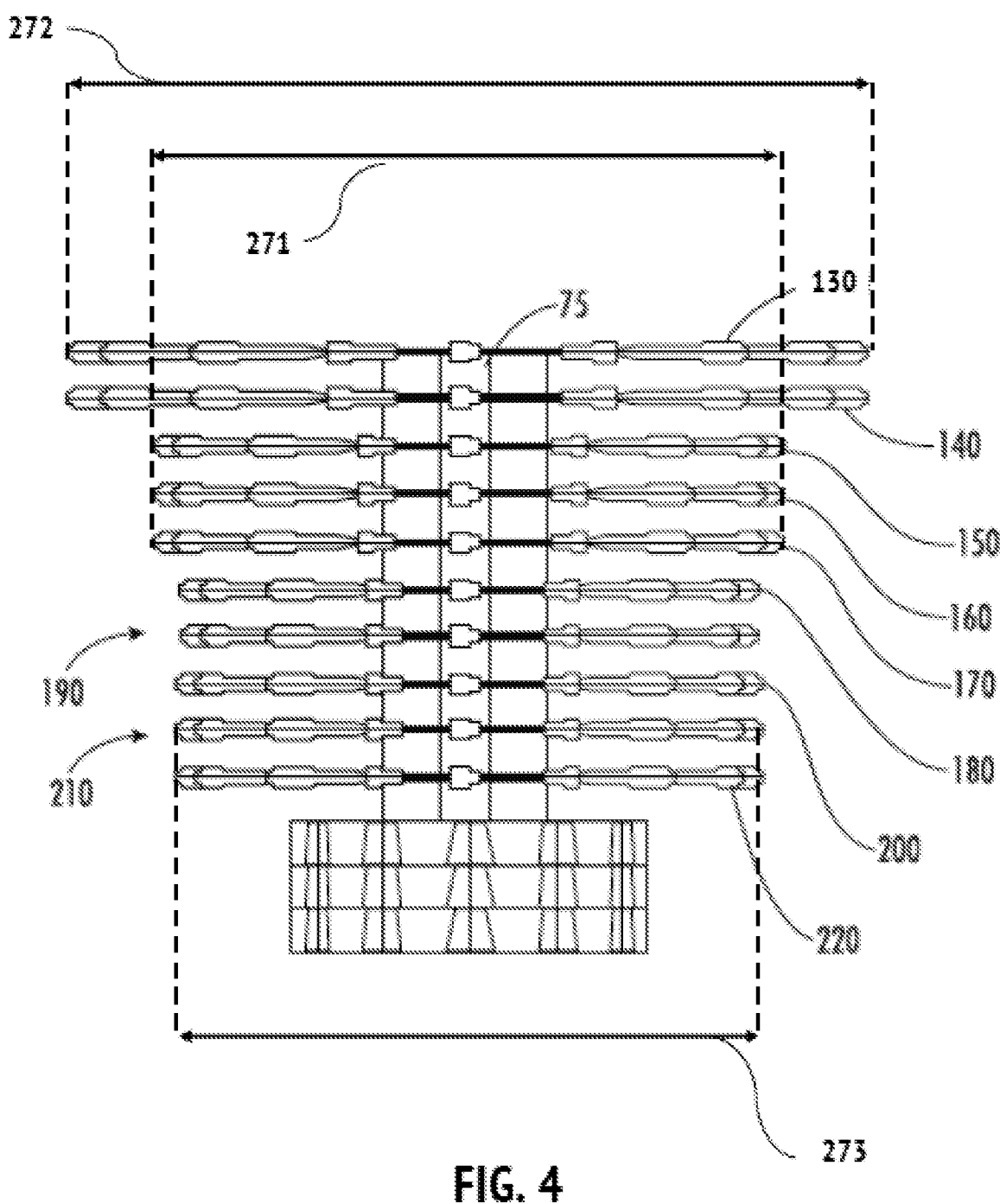
FIG. 4 is a side view diagram of a plurality of drying scoop assemblies at maximum extension during spinning.

FIG. 4 shows a plurality of drying scoop assemblies 130, 140, 150, 160, 170, 180, 190, 200, 210, 220 separated by a plurality of foam disc spacers 40 each with an outer diameter 41. The foam disc spacers 40 and plurality of drying scoop assemblies 130, 140, 150, 160, 170, 180, 190, 200, 210, 220 are arranged on a cylindrical rotational core 75. A first sub-plurality of drying scoop assemblies 190, 200, 210, 220 has a first length 273. A second sub-plurality of drying scoop assemblies 150, 160, 170 has a second length 271. A third sub-plurality of drying scoop assemblies 130, 140 has a third length 272. The first length 273, second length 271, and third length 272 are different from one another. In the embodiment shown in FIG. 4, the first length 273 is less than the second length 271 which is less than the third length 272.

Figure 5:
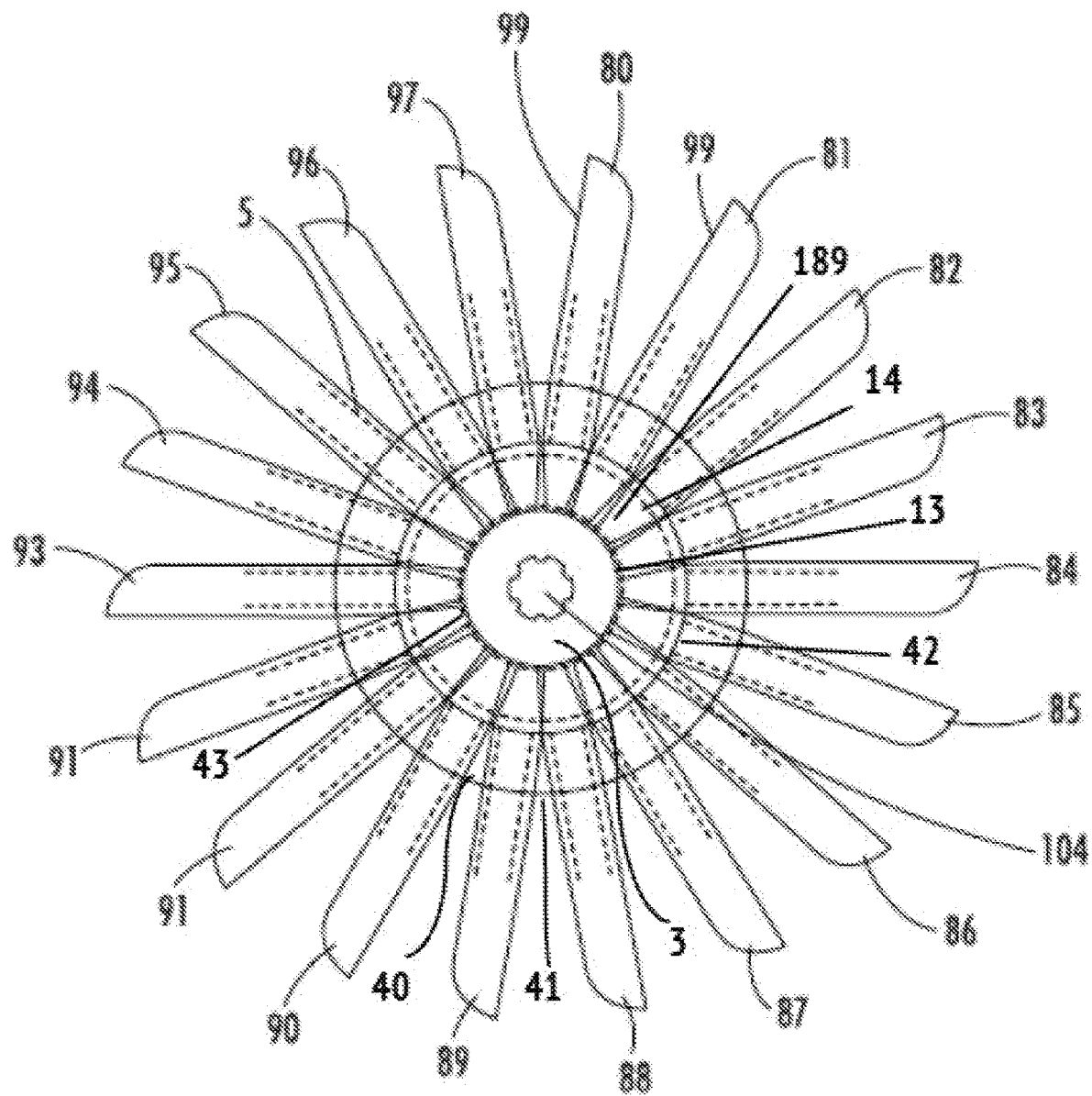
FIG. 5 is a top perspective view a drying scoop assembly, showing foam disc spacers of different outer diameters.

FIG. 5 is a top view showing another embodiment of a drying scoop assembly 99 which is comprised of a cloth disc 189 and the plurality of eighteen longitudinal drying scoops 80, 81, 82, 83, 84, 85, 86, 87, 88, 89, 90, 91, 92, 93, 94, 95, 96, 97. The cloth disc 189 has an inner diameter 43 and an outer diameter 42. The drying scoop assembly 99 has a foam disc spacer 40 underneath. The foam disc spacer has an outer diameter 41 and an inner diameter 43. The cloth disc 189 and the foam disc spacer 40 have the same inner diameter 43. The inner diameter 43 of the cloth disc 189 and the foam disc spacer 40 is the same as the outer diameter 43 of the cylindrical rotational core 75. The plurality of eighteen longitudinal drying scoops 80, 81, 82, 83, 84, 85, 86, 87, 88, 89, 90, 91, 92, 93, 94, 95, 96, 97 are sewn 13, 14 to the cloth disc 189. A first stitching 14 is sewn near the outer diameter 42 of the cloth disc 189; a second stitching 13 is sewn near the inner diameter 43. From the top, the aluminum top plate 3 is visible, including the opening 104 to mate the aluminum top plate 3 to the drive shaft 2. The aluminum top plate 3 covers the cylindrical rotational core 75 and obscures it in this view. A foam disc spacer 40 is visible underneath the drying scoop assembly 99.

Figure 6:
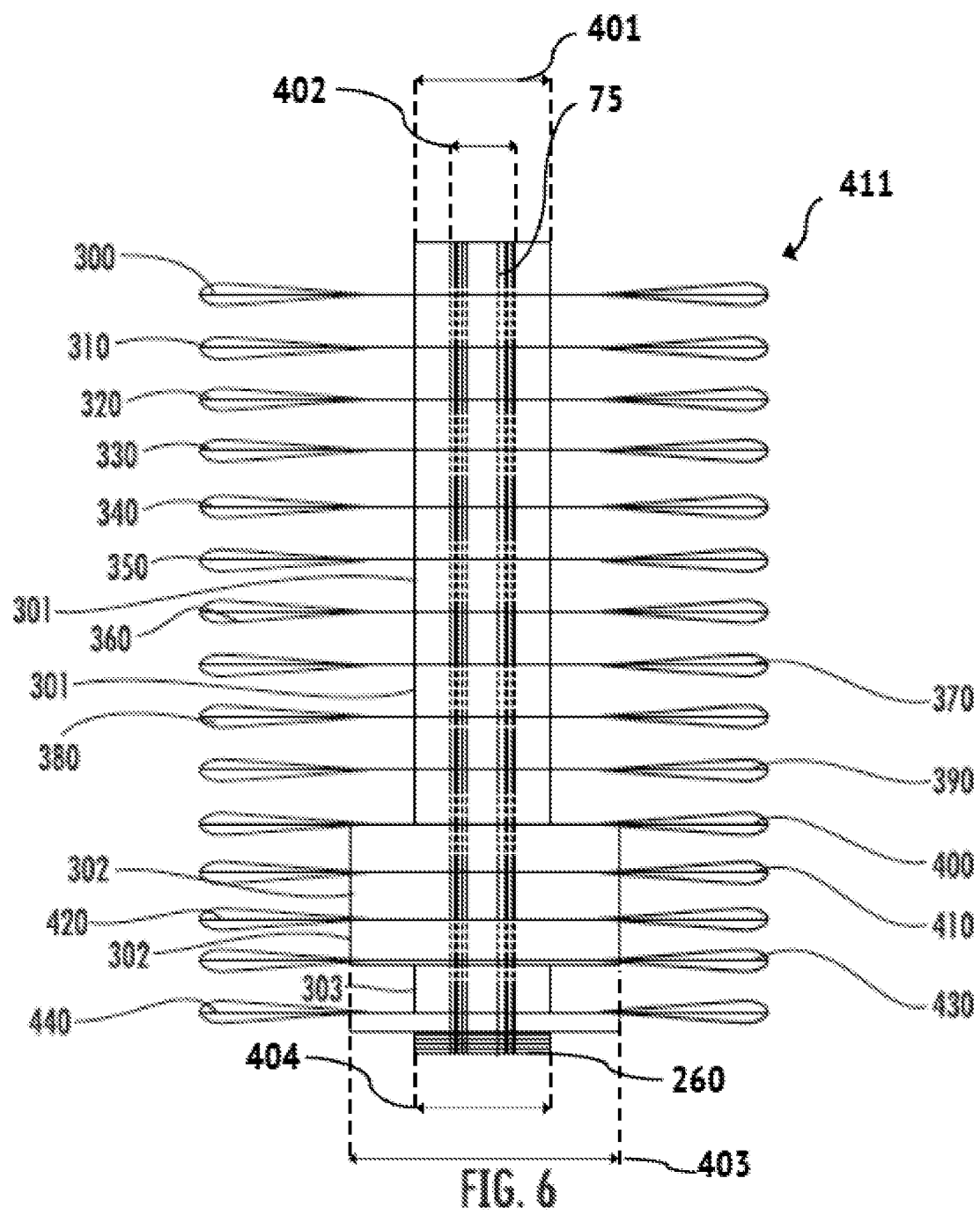
FIG. 6 is side view of the carwash dryer apparatus stack-up.

FIG. 6 shows an alternative embodiment of the carwash dryer apparatus 411 wherein various diameter foam disc spacers 301, 302 are used. This embodiment contains a plurality of drying scoop assemblies 300, 310, 320, 330, 340, 350, 360, 370, 380, 390, 400, 410, 420, 430, 440 arranged on a cylindrical rotational core 75. The upper drying scoop assemblies 300, 310, 320, 330, 340, 350, 360, 370, 380, 390 are interspersed with a first plurality of identical foam disc spacers 301 having a first outer diameter. There are two stiffened drying scoop assemblies 410, 420 that have a second plurality of foam disc spacers 302 having a second outer diameter. Here, the first outer diameter is less than the second outer diameter. This effectively stiffens the two stiffened drying scoop assemblies 410, 420. There are two transition drying scoop assemblies 400, 430. The first transition drying scoop assembly 400 has a foam disc spacer 301 having a first outer diameter on its top side and a foam disc spacer 302 having a second outer diameter on its bottom side. The second transition drying scoop assembly 430 has a foam disc spacer 301 having a first outer diameter on its bottom side and a foam disc spacer 302 having a second outer diameter on its top side. The bottom plate 260 holds the foam disc spacers 301, 302, 303 and the plurality of drying scoop assemblies 300, 310, 320, 330, 340, 350, 360, 370, 380, 390, 400, 410, 420, 430, 440 in place. A first sub-plurality of foam disc spacers 301 has a first outer diameter 401 and an inner diameter 402, the inner diameter 402 being equal to the outer diameter 402 of the cylindrical rotational core 75. A second plurality of foam disc spacers 302 has a second outer diameter 403 and an inner diameter 402, the inner diameter 402 being equal to the outer diameter 402 of the cylindrical rotational core 75. The first outer diameter 401 being smaller than the second outer diameter 403. The bottom plate 260 has an outer diameter 404, which is greater than the outer diameter 402 of the cylindrical rotational core 75.

Figure 7:
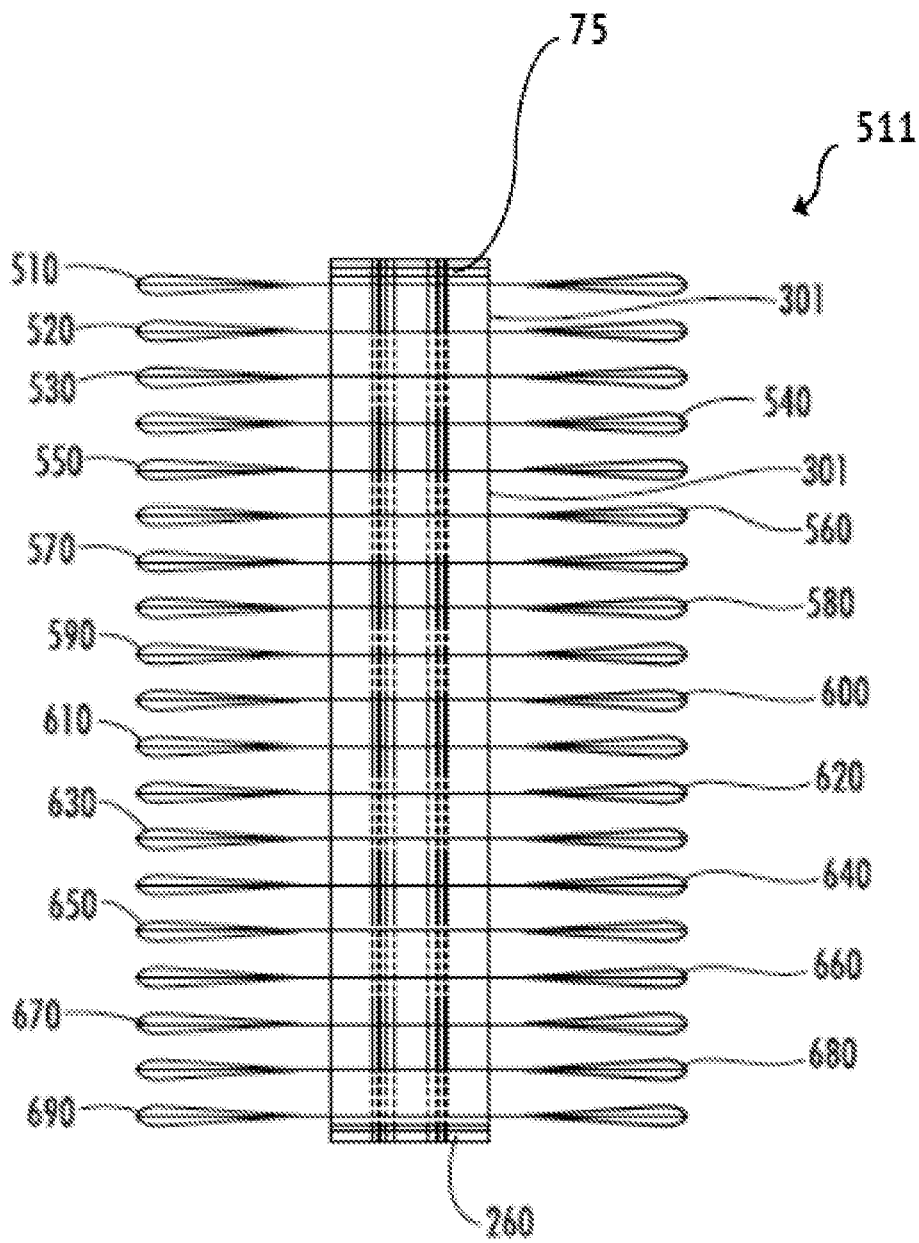
FIG. 7 is a side view of alternative embodiment of the carwash dryer apparatus.

FIG. 7 shows an alternative embodiment of the carwash dryer apparatus 511. In this embodiment 511, there is a plurality of drying scoop assemblies 510, 520, 530, 540, 550, 560, 570, 580, 590, 600, 610, 620, 630, 640, 650, 660, 670, 680, 690 which are arranged on a cylindrical rotational core 75 and which are separated by equally sized foam disc spacers 301 with a first outer diameter.

Figure 9:
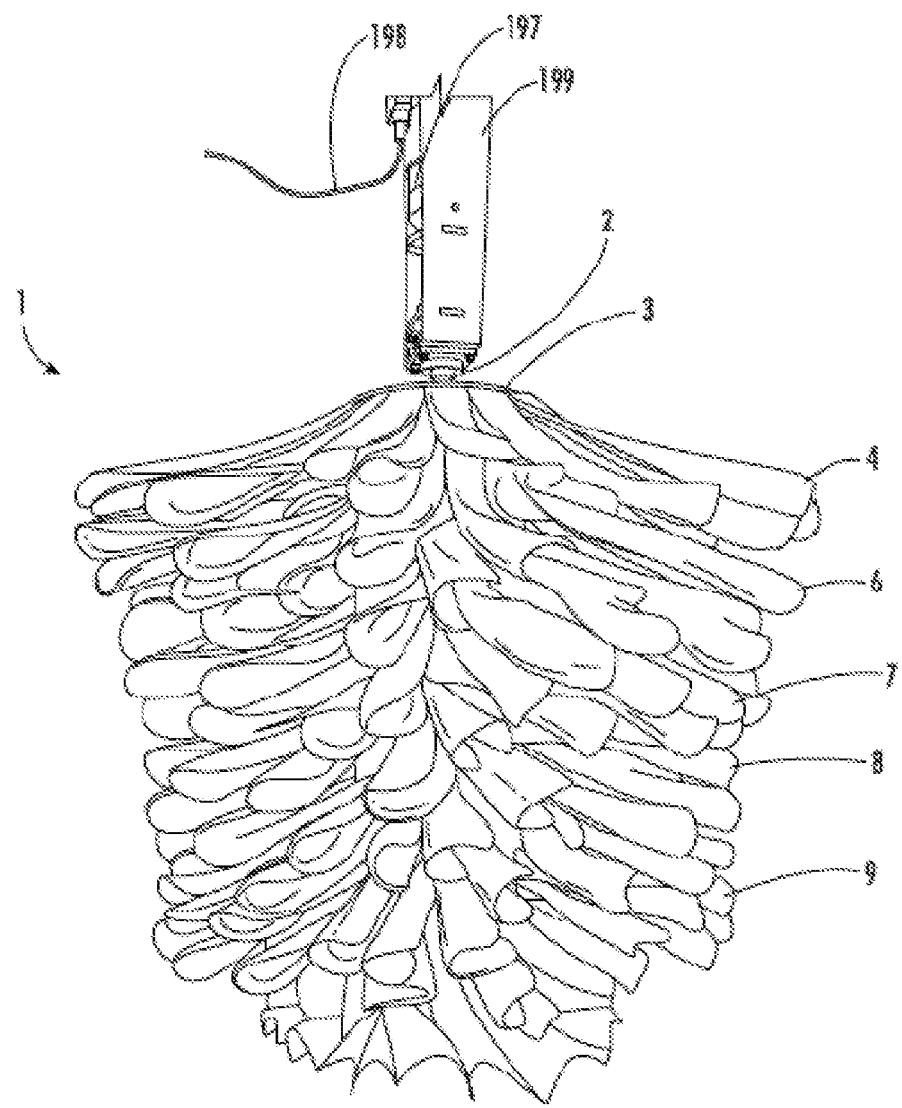
FIG. 9 is a side view of the carwash dryer apparatus in motion, showing the action of the drying scoops.

FIG. 9 shows the first embodiment of the carwash dryer apparatus 1 in motion. The plurality of drying scoops 4, 6, 7, 8, 9 are forced outward by centrifugal force. A voltage-controlled motor assembly 197 having a motor controller and connected to the drive shaft 2 rotates the apparatus 1. The motor with an integral controller 197 is powered by a power line 198 and is housed in a housing 199. The drying scoops 4, 6, 7, 8, 9 catch air and expand as they spin. When the drying scoops 4, 6, 7, 8, 9 contact the exterior of a wet vehicle, the drying scoops 4, 6, 7, 8, 9 quickly absorb the water. After the carwash dryer apparatus 1 is no long in contact with the car, the drying scoops 4, 6, 7, 8, 9 quickly eliminates the retained water through a combination of centrifugal force and vaporization. The normal centrifugal force of a rotational body forces the retained water to the rounded, free end (e.g., 46) of the drying scoops 4, 6, 7, 8, 9, where much of the water liberates itself as droplets. The remainder of the retained water is vaporized, because the drying scoop shape 4, 6, 7, 8, 9 is specifically designed to vaporize the residual water contained in the drying scoops 4, 6, 7, 8, 9. The specific shape of the drying scoop is optimized to both pick up as much water as possible when it contacts the wet surface of a vehicle; and eliminate as much water as possible in as short of period of time as possible, through the combined processes of centrifugal expulsion and vaporization. The carwash dryer apparatus 1 dries the dryer scoops 4, 6, 7, 8, 9 in a non-contact fashion, lengthening its useful life, reducing maintenance, and minimizing the risk of airborne projectiles.

Figure 8:
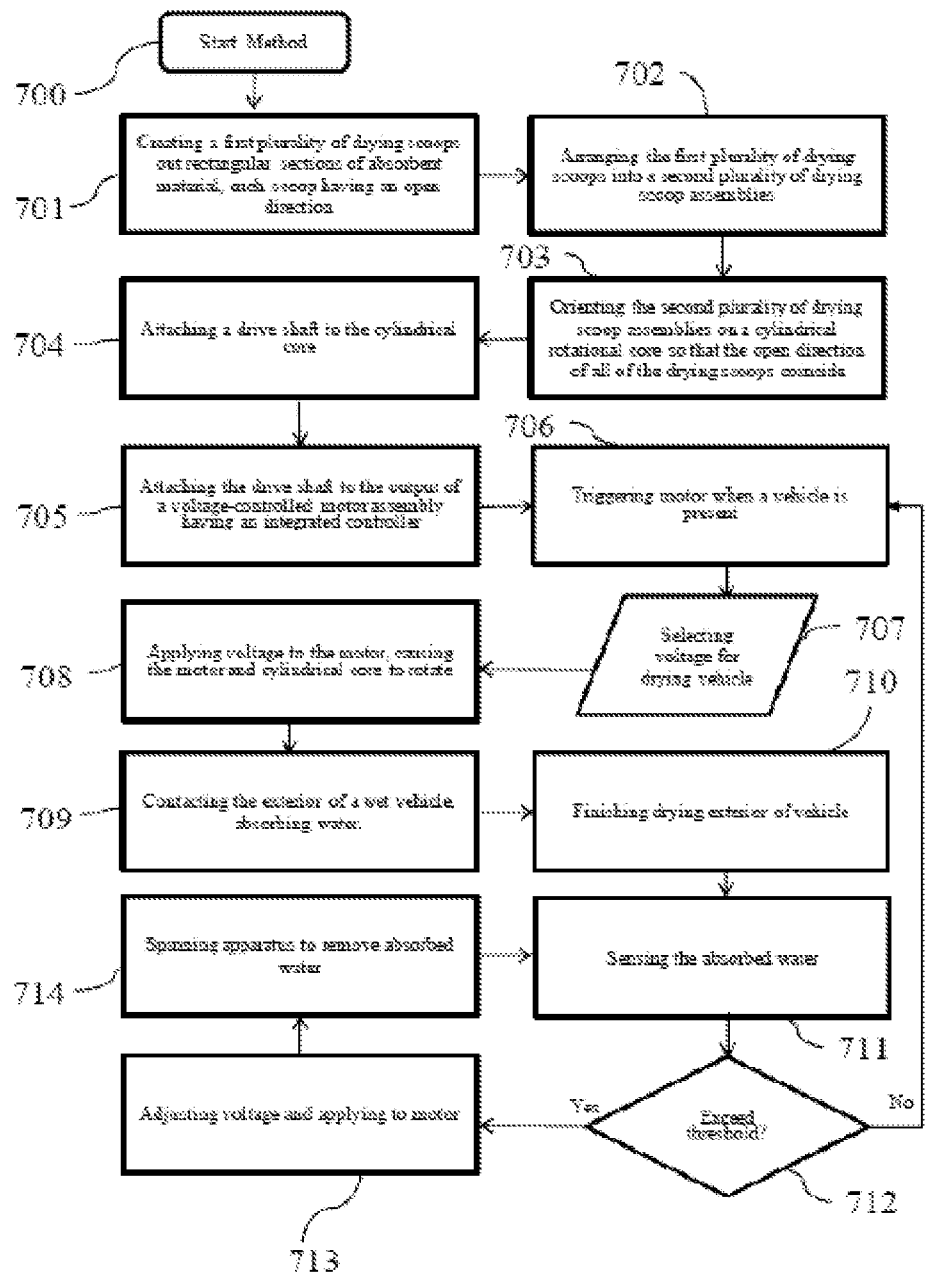
FIG. 8 is flow chart of the primary method taught in this patent.

FIG. 8 is a flow chart of the method. The method 700 comprises the steps of creating 701 a first plurality of drying scoops out of rectangular sections of absorbent material, each drying scoop having an open direction; arranging 702 the first plurality of drying scoops into a second plurality of drying scoop assemblies, so that the open direction of each of the drying scoops is pointed in the same rotational direction; orienting 703 the second plurality of drying scoop assemblies on a cylindrical rotational core so that the open direction of all the drying scoops coincided with the direction of intended rotation; attaching 704 a drive shaft to the cylindrical rotational core; attaching 705 the drive shaft to the output of a voltage-controlled motor, with an integrated controller; triggering 706 motor when a vehicle to be dried is present; selecting 707 a voltage for drying a vehicle; applying 708 the voltage to the motor, causing the motor and cylindrical core to rotate; contacting 709 the exterior of a wet vehicle and absorbing water therefrom; finishing 710 drying exterior of vehicle; sensing 711 the absorbed water retained in the drying scoops; determining 712 if the absorbed water exceeds a desired threshold; adjusting the voltage 713 if the absorbed water exceeds the desired threshold; spinning 714 the apparatus to remove absorbed water; and repeating 711, 712, 713, 714 until the absorbed water in the drying scoops is below the threshold level, at which point the method dwells until it is triggered 706 by another vehicle. In one embodiment, the sensing can be accomplished using the motional electro-motive force (motional EMF). The voltage supplied to the motor is adjusted based off of the sensing. The voltage supplied to the motor can be continuously varied, based on real-time sensing, in order to remove water in an optimized fashion. In a more basic version, there is one voltage to dry vehicles and a second voltage with which to dry the apparatus.

I claim:

1. A carwash dryer apparatus comprising:
   a voltage-controlled motor;
   a motor controller, controlling the voltage delivered to the motor;
   a drive-shaft coupled to the output of the motor;
   a cylindrical rotational core;
   a top plate for attaching the cylindrical rotational core to the drive shaft;
   a bottom plate having an outer diameter and fitted to the bottom of the cylindrical rotational core;
   a plurality of drying scoops;
   a smaller number of cloth rings, having an inner diameter and an outer diameter;
   and a smaller number of foam disc spacers, having an inner diameter and an outer diameter;
   wherein the plurality of drying scoops are constructed from rectangles of an absorbent material, having a centerline, two long edges, a fixed short edge, and a rounded short edge;
   wherein, in order to make a scoop, the rectangles are folded, the long edges are sewn together in proximity of the fixed short end, and the folded halves are also sewn together in proximity to, and parallel with, the centerline;
   wherein the long edges are not sewn together in proximity of the rounded short edge;
   wherein the number in the plurality of drying scoops is divided by the smaller number, integer plurality of cloth rings to produce an assembly integer;
   wherein the assembly integer dictates how many drying scoops are sewn to a single cloth ring, creating a drying scoop assembly;
   wherein the fixed end of the drying scoops are sewn to the single cloth ring; and
   wherein the drying scoop assemblies and the foam disc spacers are alternated axially along the cylindrical rotational core.

2. The carwash dryer apparatus of claim 1, wherein the drying scoops are oriented so as to capture air as the carwash dryer apparatus is rotated.

3. The carwash dryer apparatus of claim 2, wherein the cylindrical rotational core has an outer diameter.

4. The carwash dryer apparatus of claim 3, wherein the inner diameter of each of the plurality of cloth rings is the same as the outer diameter of the cylindrical rotational core outer diameter.

5. The carwash dryer apparatus of claim 4, wherein the inner diameter of each of the plurality of foam disc spacers is the same as the outer diameter of the cylindrical rotational core outer diameter.

6. The carwash dryer apparatus of claim 5, wherein the carwash dryer apparatus removes water from the exterior of a vehicle by having the plurality of drying scoops contact the vehicle exterior.

7. The carwash dryer apparatus of claim 6, wherein the absorbent material is 10-lb. foam.

8. The carwash dryer apparatus of claim 6, wherein the absorbent material is absorbent felt.

9. The carwash dryer apparatus of claim 6, wherein the plurality of drying scoops can be sub-divided into two smaller sub-plurality of drying scoops, wherein the first sub-plurality of drying scoops has a first length and the second sub-plurality of drying scoops has a second length; and wherein the first and the second length are not identical.

10. The carwash dryer apparatus of claim 9, wherein the first sub-plurality uses a first absorbent material and the second sub-plurality uses a second absorbent material.

11. The carwash dryer apparatus of claim 6, wherein the smaller number of foam disc spacers can be sub-divided into two smaller sub-pluralities of foam disc spacers, wherein the first sub-plurality of foam disc spacers has a first outer diameter; wherein the second sub-plurality of foam disc spacers has a second outer diameter; and wherein the first outer diameter and the second outer diameter are different.

12. The carwash dryer apparatus of claim 6, wherein the motor controller uses a motional electro-motive force (motional EMF) to adjust the voltage provided to the motor.

13. The carwash dryer apparatus of claim 6, wherein the motor controller provides the motor a first voltage when the carwash dryer apparatus is removing water from the exterior of a vehicle.

14. The carwash dryer apparatus of claim 13, wherein the motor controller provides the motor a different voltage when the carwash dryer apparatus is eliminating retained water from the drying scoops.

15. The carwash dryer apparatus of claim 14, wherein the different voltage is a single, higher voltage, when compared with the first voltage.

16. The carwash dryer apparatus of claim 14, wherein the different voltage is two or more higher voltages, when compared with the first voltage.

17. The carwash dryer apparatus of claim 14, wherein the different voltage is a higher, variable voltage, when compared with the first voltage.

18. The carwash dryer apparatus of claim 14, wherein the different voltage is a single, lower voltage, when compared with the first voltage.

19. The carwash dryer apparatus of claim 14, wherein the different voltage is a lower, variable voltage, when compared with the first voltage.

20. The carwash dryer apparatus of claim 14, wherein the different voltage is two or more lower voltages, when compared with the first voltage.

21. The carwash dryer apparatus of claim 14, wherein the different voltage can be adjusted based off of a real-time motional EMF so that it, at a first point in time, is greater than the first voltage, and at a second point in time, less than the first voltage.

22. A method for removing water from the exterior of a vehicle comprising the steps of
creating a first plurality of drying scoops out of rectangular sections of absorbent material, each drying scoop having a centerline, two long edges, a fixed short edge, and a rounded short edge, wherein the long edges are sewn together in proximity of the fixed short end, and wherein the long edges, thus sewn together, define an open direction of travel for the drying scoop;
arranging the first plurality of drying scoops into a second plurality of drying scoop assemblies, so that the open direction of travel of each of the drying scoops is oriented in the same rotational direction;
orienting the second plurality of drying scoop assemblies on a cylindrical rotational core so that the open direction of travel of all of the drying scoops coincide with the direction of rotation of the cylindrical rotational core;
attaching a drive shaft to the cylindrical core;
attaching the drive shaft to the output of a voltage-controlled motor assembly having an integrated controller;
triggering the voltage-controlled motor when a vehicle to be dried is present;
selecting a voltage for drying the vehicle;
applying voltage to the motor, causing the cylindrical core to rotate;
contacting the exterior of a wet vehicle with the drying scoop so arranged and absorbing water therefrom; and
finishing drying the exterior of the vehicle.

23. The method of removing water from the exterior of a vehicle of claim 22, comprising the further step of
sensing, in real time, the amount of absorbed water contained in the drying scoop assemblies.

24. The method for removing water from the exterior of a vehicle of claim 23, comprising the further steps of
determining if the absorbed water contained in the drying scoop assemblies exceeds a pre-defined threshold.

25. The method for removing water from the exterior of a vehicle of claim 24, wherein, when the absorbed water contained in the drying scoop assemblies exceeds a pre-defined threshold, the method is comprised of the further additional steps of
adjusting the voltage supplied to the motor;
spinning the cylindrical rotational core to remove the absorbed water from the drying scoop assemblies;
sensing the absorbed water left in the drying scoop assemblies;
determining if the absorbed water contained in the drying scoop assemblies exceeds the pre-defined threshold; and
iterating the water contained in the drying scoop assembles does not exceed the pre-defined threshold.

26. The method for removing water from the exterior of a vehicle of claim 25, comprising the further step of
adjusting the voltage supplied to the motor continuously, based on the amount of water remaining in the drying scoop assemblies.

* * * * *